United States Patent [19]

Bowman

[11] 4,413,514

[45] Nov. 8, 1983

[54] AIR FLOW SENSOR

[75] Inventor: William W. Bowman, Dallas, Tex.

[73] Assignee: Hoffman Controls Corporation, Dallas, Tex.

[21] Appl. No.: 266,487

[22] Filed: May 22, 1981

[51] Int. Cl.$^3$ .............................................. G01F 1/68
[52] U.S. Cl. ................................................. 73/204
[58] Field of Search ................ 73/198, 204, 189, 202; 138/37, 39, 44

[56] References Cited

U.S. PATENT DOCUMENTS

| | | | |
|---|---|---|---|
| 3,068,693 | 12/1962 | Ferran et al. | 73/204 |
| 3,123,900 | 3/1964 | Millar | 138/39 X |
| 3,220,255 | 11/1965 | Scranton et al. | 73/204 |
| 3,363,462 | 1/1968 | Sabin | 73/204 |
| 3,372,590 | 3/1968 | Sterling | 73/204 |
| 3,735,752 | 5/1973 | Rodder | 73/204 |
| 3,891,391 | 6/1975 | Boone | 73/204 |
| 4,343,183 | 8/1982 | Plapp | 73/204 |

Primary Examiner—Herbert Goldstein
Attorney, Agent, or Firm—Kenneth R. Glaser

[57] ABSTRACT

A velocity sensor enclosed within a venturi housing is disposed in a moving fluid stream. A self-heated, negative coefficient thermistor is supported in the interior of the housing to sense changes in velocity of the stream. A positive coefficient thermistor is supported on the exterior of the housing and compensated for fluctuations in the ambient air temperature. The negative coefficient thermistor is operated at a temperature substantially above ambient. An automatic starting circuit is provided for cold start-up and initially heats the negative coefficient thermistor to the elevated operating temperature.

8 Claims, 9 Drawing Figures

AIR FLOW SENSOR

BACKGROUND OF THE INVENTION

1. Field of the Invention:

The present invention relates generally to fluid velocity measuring devices and more specifically to a sensor assembly using a self-heated thermistor for sensing the velocity of an air stream.

2. Description of the Prior Art:

It is often desirable to measure the velocity of air flow through a duct, such as in an air conditioning system. A wide variety of velocity detection methods have been devised. Perhaps the most common method of detecting fluid velocities in general is by measuring a pressure differential across a shaped member having known properties.

When measuring air flow at relatively low levels, pressure differentials are not reliable because of the magnitudes of the quantities involved. It is known to use various methods wherein the velocity of air flow is detected indirectly by measuring the capacity of the air to transfer heat from a heated element.

It is known to heat a thermistor by using a separate heating element. The thermistor is heated slightly above the ambient temperature, and the cooling effect of moving air is reflected as a change in the resistance. Means are sometimes provided to compensate for temperature fluctuations in the moving air stream.

Detection methods presently used in the art generally have accuracy limitations, especially at low velocities. This may be caused by nonlinearity in the electrical components and turbulence in the fluid flow.

OBJECTS OF THE INVENTION

It is therefore an object of the present invention to provide for an improved velocity detector which accurately detects air velocity.

It is a further object of the present invention to provide for an improved detector which accurately measures the velocity of slowly moving air streams.

It is another object of the present invention to provide for a new and improved sensing probe which utilizes thermistors as the detecting elements.

It is yet another object of the present invention to provide for a probe housing which eliminates turbulence from the regions around the detecting thermistor to improve the accuracy of the device.

And it is another object of the present invention to provide a starting circuit for initially bringing the heated thermistor up to its operating temperature.

SUMMARY OF THE INVENTION

According to the present invention, a sensor probe includes a housing shaped to minimize fluid turbulence in its interior. A self-heated thermistor is supported in the interior of the casing, and a non-heated thermistor is supported near the exterior of the casing to compensate for changes in the air temperature.

A preferred embodiment of the present invention utilizes the properties of thermistor devices. The resistance of a negative temperature coefficient device decreases with increasing temperature, and that of a positive temperature coefficient device increases with increasing temperature.

Air flowing past a heated device will remove heat from the device. An increase in the rate of air flow will increase the heat transfer between the heated device and the air cooling device. The present invention combines the heat transfer characteristics of a moving fluid with the change in resistance with temperature of a thermistor to produce an output voltage which varies with changing air velocity. The preferred embodiment utilizes a thermistor which is self-heated to a temperature substantially above that of the air stream to improve sensitivity.

The preferred embodiment of the present invention comprises two basic interconnected structures. The first structure includes a housing which is placed within the fluid flow. The casing houses two thermistors which are exposed to the fluid medium. The second structure comprises the circuitry used to drive the thermistors for proper operation. The control circuitry includes suitable start-up and calibration components to initially bring the thermistors to their operating regions and to calibrate the apparatus to properly indicate the velocity of fluid flow.

Appropriate circuitry is provided to raise the heated thermistor to a temperature substantially above the air temperature. In a preferred embodiment, an automatic start up circuit couples a power source to the heated thermistor to initially bring it up to the operating temperature.

The self-heated thermistor is cooled by heat transfer to the moving air stream. The rate of heat transfer is proportional to the air velocity. The resistance of the thermistor changes as the thermistor cools, which causes a voltage change when the thermistor is operated in a constant current mode.

The novel features which characterize the present invention are defined by the appended claims. The foregoing and other objects and advantages of the invention will hereinafter appear, and for purposes of illustration, but not of limitation, a preferred embodiment is shown in the accompanying drawings.

DETAILED DESCRIPTION OF THE PREFERRED EMBODIMENT

The present invention is especially adapted for measuring the flow of slowly moving air in an air conditioning system. The relatively low air flow levels found in such systems require that the velocity sensor accurately detect changes in these flows. The sensor and control circuit used in the preferred embodiment ensure accuracy in the measured air velocity.

Figure 1:
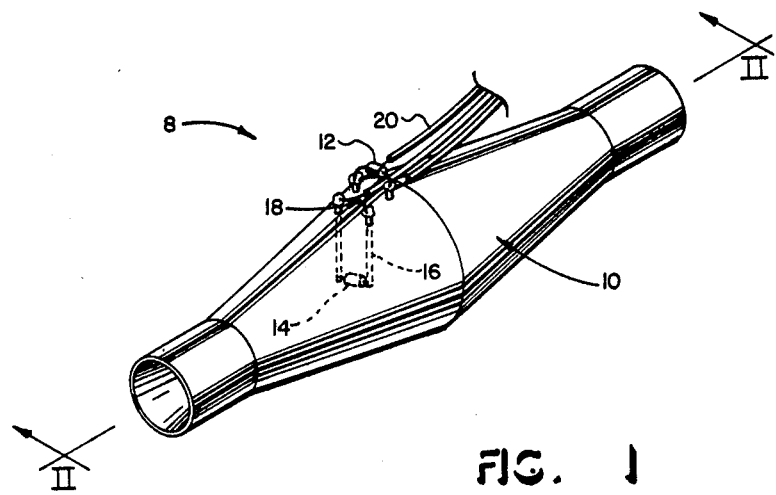
FIG. 1 is a perspective view of a velocity sensor probe.

Referring to FIG. 1, a detection probe, suitable for insertion into a moving air stream and designated generally by the reference numeral 8, has a housing 10. A calibrating thermistor 12 is mounted on the outside of the housing 10, and is spaced a short distance from the outer surface thereof. A detecting thermistor 14 is suspended in the hollow interior of the casing 10 by support leads 16. The support leads 16 are electrically conductive and mechanically couple the detecting thermistor 14 to the exterior of the casing 10. Electrical leads 18 are coupled to the interior thermistor 14 and leads 20 are coupled to the exterior thermistor 12 to connect both sensors 12, 14 to the remote control circuit.

Figure 2:
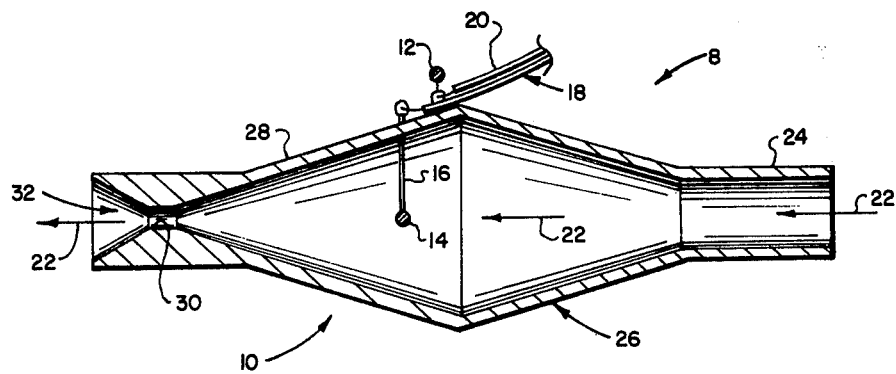
FIG. 2 is a cross-section of the probe taken along the line 2—2 of FIG. 1.

Referring to FIG. 2, a cross-section of the sensor casing 10 is shown. Air flows through the casing 10 from right to left as indicated by air flow arrows 22. An intake end 24 of the casing 10 is cylindrical. Downstream of the intake end 24 is a diverging cone section 26. The casing 10 increases in cross-section in the diverging cone section 26, then decreases in cross-section in a converging cone section 28. The converging cone section is followed by a narrow channel 30, and a discharge end 32 of the casing 10 expands to the same cross-section as the intake end 24.

Figure 8:
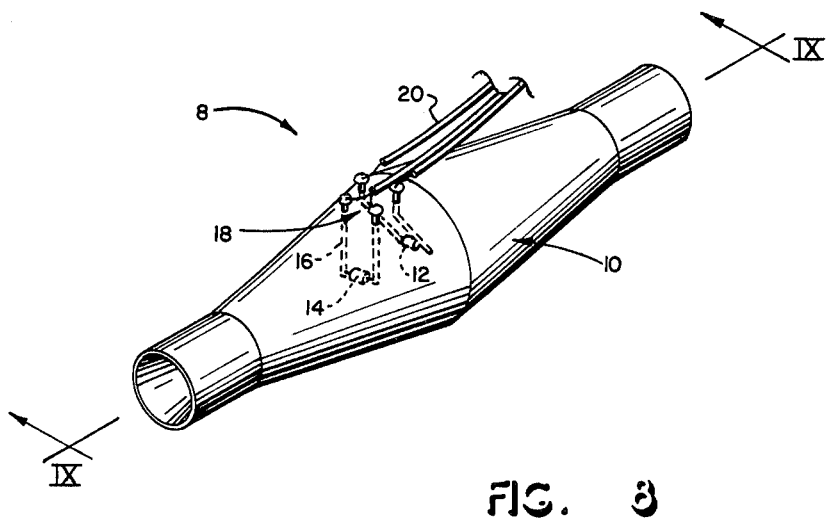
FIG. 8 is a perspective view of a velocity sensor probe.
Figure 9:
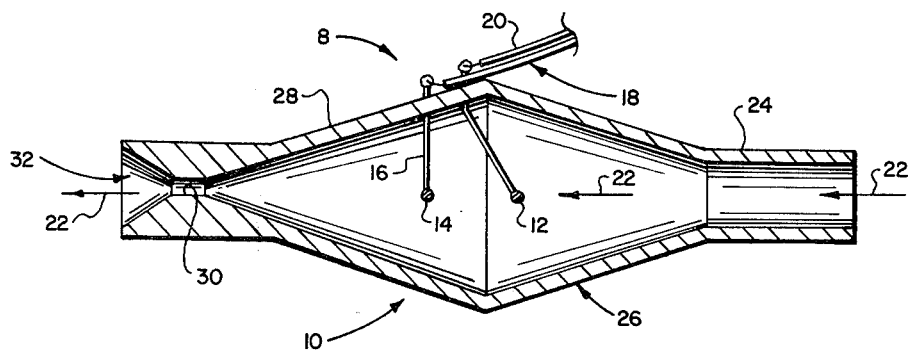
FIG. 9 is a cross-section of the probe taken along the lines 9—9 of FIG. 8.

The detecting thermistor 14 is suspended along the central axis of the housing 10 near the junction of the diverging cone 26 and the converging cone 28. The compensation thermistor 12 is supported on the outside of the casing 10 at a point near to the detecting thermistor 14. In an alternate embodiment (FIG. 8 and FIG. 9), the compensation thermistor 12 is supported inside of the casing 10 along the central axis at a point upstream of the detecting thermistor 14. In this arrangement, the thermistors are separated by a distance great enough so that the radiation heating effect is insignificant.

Air entering the intake end 24 gradually expands, followed by a gradual compression as the channel 30 is approached. The narrow channel 30 provides back pressure in the casing 10, which decreases turbulence. Experience has shown that this shape for the probe 8 provides a relatively smooth output from the heated sensor 14, as opposed to an erratic output due to turbulence.

The detection thermistor 14 is heated to an operating temperature substantially above the ambient temperature of the air. This is accomplished by the circuitry discussed below in FIGS. 3 through 7. The non-turbulent constant flow of air moving by the thermistor 14 carries away heat and cools the detection thermistor 14. The detection thermistor 14 is preferably a negative temperature coefficient (NTC) thermistor so that its resistance rises as its temperature decreases.

An operating temperature for the thermistor 14 is chosen so that the change in power dissipated by the heated thermistor 14 will vary linearly with duct temperature changes at a constant air flow velocity. The preferred embodiment operates with the hot sensor 14 heated to approximately 300 degrees centigrade.

Figure 3:
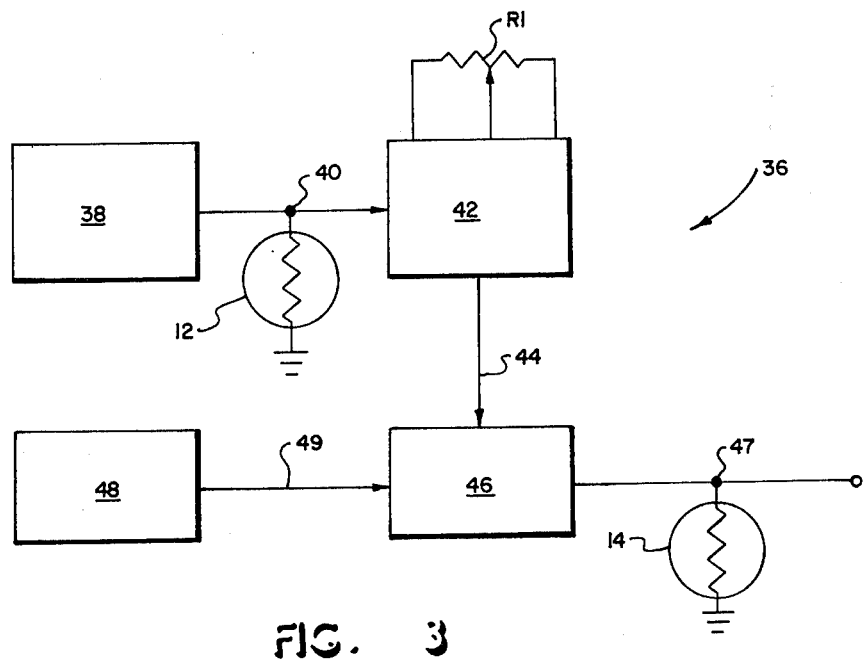
FIG. 3 is a block diagram of a control circuit.

A block diagram of a control circuit 36 for use with the flow probe 8 is shown in FIG. 3. A current generator 38 conducts a constant current through the compensation thermistor 12. This current is low enough so that the temperature of the compensation sensor 12 is not raised substantially due to resistance heating. A voltage 40, developed across the cold sensor 12 by the constant current source 38, varies in response to changes in the resistance of the cold sensor 12 induced by changes in the temperature of the ambient air. The cold sensor voltage 40 is detected by a compensation sensor amplifier 42. The signal 44 generated by the compensation amplifier 42 controls the current generated by a constant current generator 46. The gain of the compensation amplifier 42 is adjustable through a variable resistor R1 to compensate for variations in operating conditions.

The current supply 46 conducts an energizing current through the detecting thermistor 14. The precise level of current through the heated thermistor 14 is controlled by the compensation signal 44, which makes its operation independent of air stream temperature changes. Thus, the voltage 47 developed across the heated sensor 14 is proportional only to the velocity of the air flow.

To assist in start-up from a cold start situation, an automatic starting circuit 48 is coupled to the hot detector 14 through the constant current generator 46. The auto start circuit 48 generates a high current surge signal 49 to initially heat the detecting sensor 14 to its operating temperature.

In operation, a constant current is conducted through the compensation sensor 12. The sensor 12 operates in a relatively cool state so that fluid flow has very little effect on its temperature. Therefore, the temperature of the compensation sensor 12 varies with the temperature of the ambient air, and is substantially independent of the velocity of the ambient air. The compensation sensor 12 is preferably a positive temperature coefficient thermistor, so that the resistance decreases with decreasing temperature. Therefore, the voltage 40 across the compensation sensor 12 rises and falls in direct relation to the temperature of the air flowing past of the probe 8.

The compensation sensor voltage 40 is amplified in the compensation amplifier 42 and is coupled to the controlled current generator 46. The purpose of correcting the detection sensor current is to compensate for the increased heat exchange capacity of colder air passing across the hot thermistor 14, thereby preventing a false indication of increased air velocity. The level of current supplied to the detecting thermistor 14 changes in proportion to the compensating sensor voltage 40. Assuming constant velocity of the air flow, if the air temperature decreases, the resistance of the hot thermistor 14 will increase due to the increased rate of heat exchange. Therefore, the controlled current through the hot thermistor 14 is decreased so that the sensor voltage 47 is not influenced by changes in air stream temperature.

The preferred operating temperature for the detecting sensor 14 of the present embodiment is approximately 300 degrees centigrade. The controlled current supply 46 of the preferred embodiment, as discussed in connection with FIG. 6, drives the hot sensor 14 in this temperature region. The preferred detector current generator 46 may not bring the detecting sensor 14 up to operating temperature as quickly as desired. Therefore, an automatic start circuit 48 applies a high current surge 49 to the heated thermistor 14, and interrupts auto start current to the thermistor 14 once it has substantially reached the operating temperature.

The voltage 47 across the detecting thermistor sensor 14 varies directly with the velocity of air moving past the detector. High velocity air flow causes the hot sensor 14 to cool faster due to increased heat exchange, which increases its resistance. The controlled current supplied through an increasing resistance generates a higher voltage 47. Likewise, a decrease in air velocity causes a decrease in the voltage 47 across the detecting sensor 14.

Figure 4:
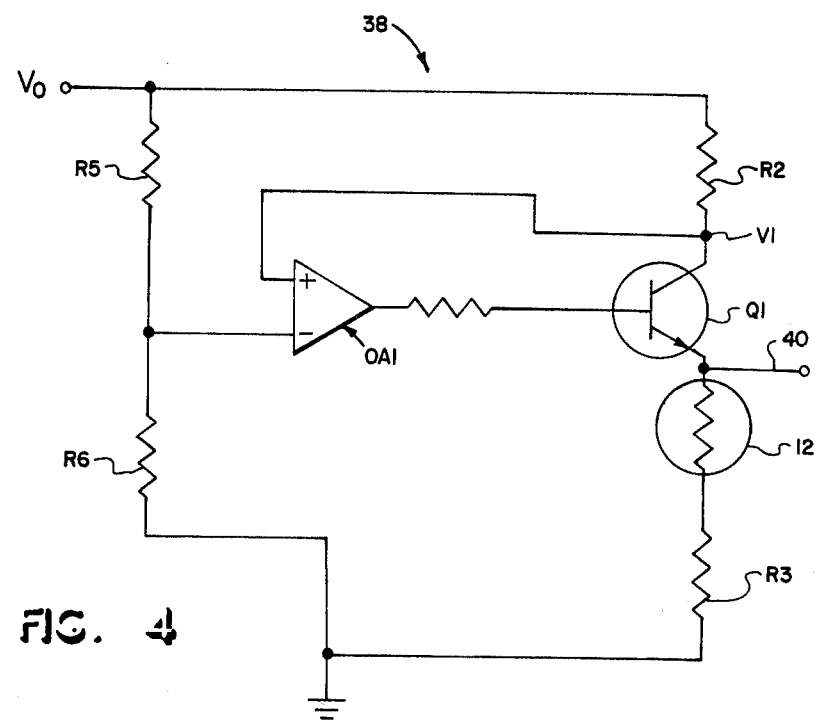
FIG. 4 is a schematic diagram of a compensation sensor constant current generator.

A preferred embodiment of a compensating constant current supply 38 is shown in FIG. 4. Supply voltage Vo is connected to a twelve volt regulated voltage supply (not shown). Operation in response to fluctuations in temperature of the ambient air near the probe 8 will be discussed, assuming equilibrium conditions.

The current through a transistor Q1 is controlled by an operational amplifier (OP AMP) OA1. Q1 is biased by collector resistor R2 and fixed emitter resistor R3. The current level is controlled by a voltage divider comprised of resistors R5 and R6, coupled to the negative input of OA1. Collector voltage V1 is connected to the positive input of OA1. Any tendency for the transistor current to increase increases the voltage drop across R2, thereby decreasing V1. This tends to lower the output of OA1, tending to decrease the transistor Q1 current. The circuit operates to keep V1, and therefore the transistor Q1 current, constant.

This constant current passes through the compensating thermistor 12. If the thermistor 12 cools, due to a drop in ambient air temperature, the resistance also drops because the thermistor 12 is a positive temperature coefficient thermistor. This drop in resistance also causes a drop in the cold thermistor voltage 40. An increase in temperature causes a corresponding increase in the thermistor voltage 40. Therefore, a positive correlation is produced between the ambient air temperature, an the compensating thermistor voltage 40.

Figure 5:
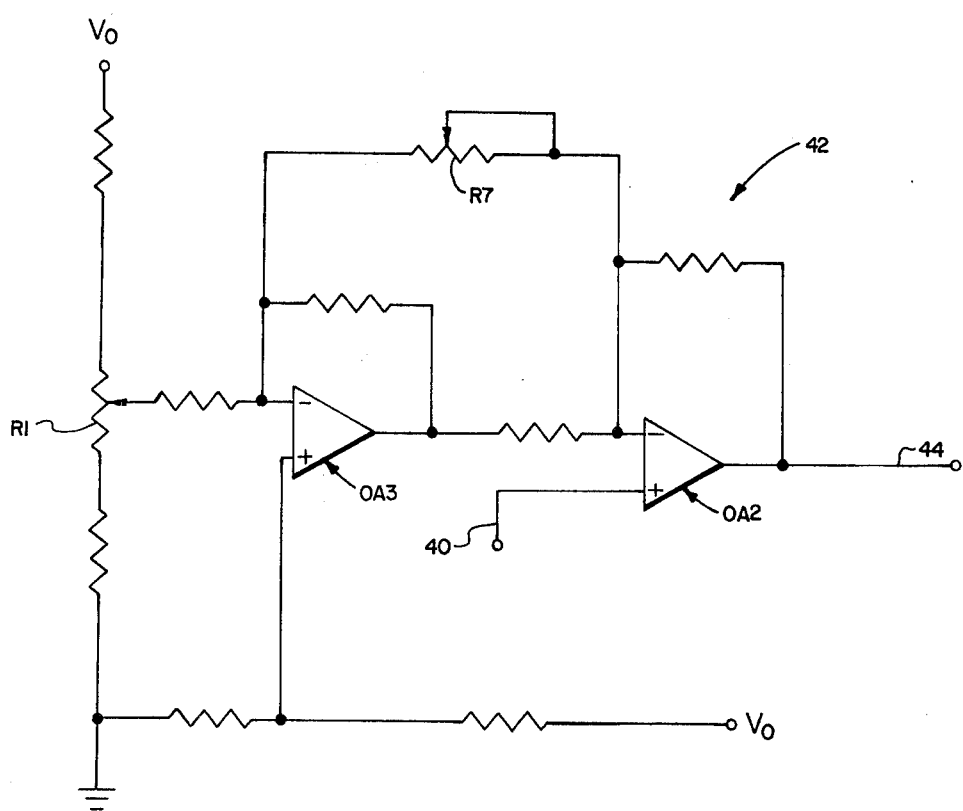
FIG. 5 is a schematic diagram of a compensation signal amplifier.

Referring to FIG. 5, a preferred embodiment for the compensation amplifier 42 is shown. The compensation sensor voltage 40 is coupled to the positive input of a first scaling OP AMP OA2, which is operated as a differential amplifier. A second scaling OP AMP OA3 is used to provide a fixed voltage into the OP AMP OA2. The calibration adjusting resistor R1 is coupled to the negative input of OA3. A second variable resistor R7 is coupled in a feed back loop between the negative input of OA2 and the negative input of OA3 and provides for setting the minimum output voltage 44. The output voltage 44 is used to control the constant current source 46.

Figure 6:
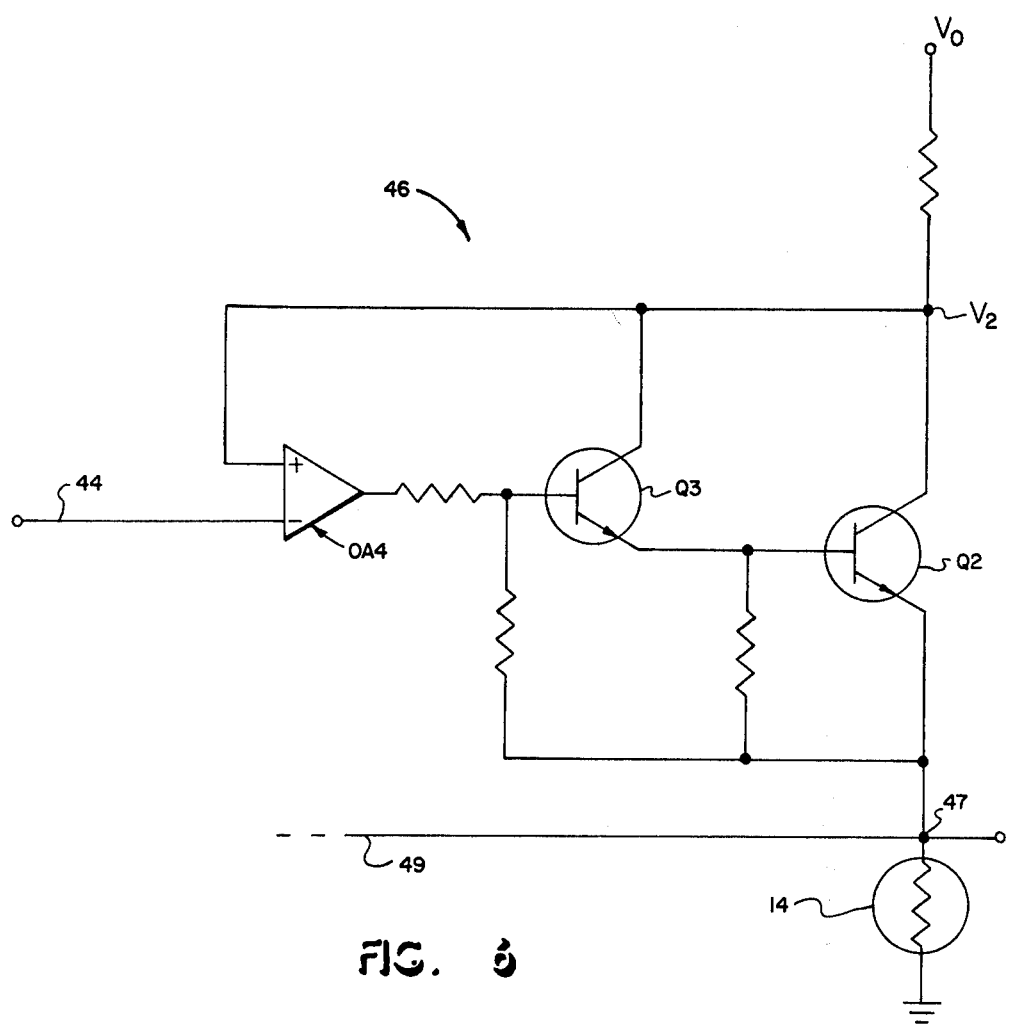
FIG. 6 is a schematic diagram of a heated sensor controllable constant current generator.

A preferred embodiment of a hot sensor current source 46 is shown in FIG. 6. The current through the hot thermistor 14 is substantially equal to that through an output transistor Q2.

The present circuit operates in a similar manner to the compensation sensor current source 38 discussed in FIG. 4. The collector voltage V2 of transistor Q2 is connected to the positive input of an OP AMP OA4. The negative input is connected to the compensating amplifier output 44. The OP AMP OA4 operates to keep voltage V2, and thus, the current through Q2 and the thermistor 14, constant.

The negative input to the operational amplifier OA4 is coupled to the compensating amplifier output 44. A decrease in ambient air temperature causes a decrease in the compensation amplifier 44 output. When that happens, the voltage 44 to the negative input of the operational amplifier OA4 of FIG. 6 decreases, tending to cause the OP AMP OA4 output voltage to increase. An increase in the output from OA4 tends to cause increase in the current through the output transistor Q2 by increasing the current through transistor Q3. Voltage V2 drops with increasing current, causing the output of OA4 to drop. The net result of a decrease in the compensation amplifier output 44 is a increase in the current through output transistor Q2. The lower temperature of the hot sensor 14 due to a decrease in the ambient air temperature would normally tend to increase the detector voltage 47. However, the increase in detector sensor 14 current caused by the lower voltage 44 to the negative input of OA4 causes the sensor voltage 47 to remain constant. Similarly the voltage 47 across the self-heated thermistor 14 remains constant when the ambient temperature increases.

Figure 7:
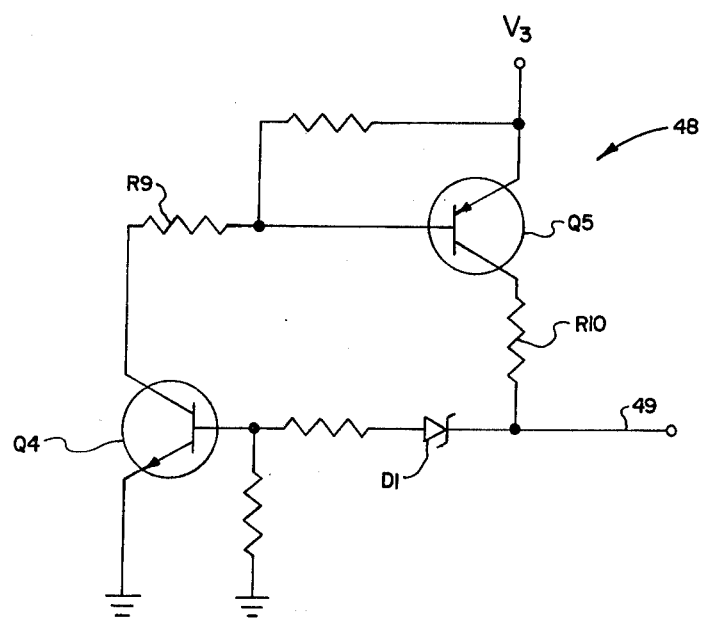
FIG. 7 is a schematic diagram of an automatic start-up current supply.

The automatic start circuit 48 is connected to the detecting thermistor 14. The circuit 48 provides increased current during a cold start-up of the thermistor 14, and automatically cuts off when the operating temperature is reached. Referring to FIG. 7, a preferred embodiment for an automatic start circuit 48 is shown. The automatic starter output 49 is equal in magnitude to the heated thermistor voltage 47.

When the detecting thermistor 14 is operating in the high temperature region, its resistance is relatively low. This causes the auto starter output voltage 49 to also be low. This voltage 49 is too low to cause avalanche breakdown of a zener diode D1, so that no current is supplied to the base of an NPN starter transistor Q4. Therefore, transistor Q4 is off. Since no current is flowing through a first collector resistor R9, the voltage at the base of the NPN transistor Q5 is substantially equal to a supply voltage V3. Since the base voltage of the second transistor Q5 is not lower than that at the emitter, transistor Q5 is also in the off state. The starter circuit 48 uses an 18 volt supply V3. This higher voltage allows more power to be delivered to the heated thermistor 14 for faster start-up.

When the hot sensor 14 is cool, its resistance is relatively high. This causes the starter output voltage 49 to be high. This voltage 49 is high enough to cause breakdown of the zener diode D1, which allows enough current to reach the base of the first starting transistor Q4 to begin conduction. As current flows into the collector of the first starting transistor Q4, the voltage at the base of the second starting transistor Q5 drops, causing transistor Q5 to begin conduction.

Part of the current conducted through the transistor Q5 goes into the base of the first transistor Q4 to turn it completely to the on state, while the remainder goes through the thermistor 14 and causes it to heat up at an increased rate. Increased conduction of the first starting transistor Q4 causes the second starting transistor Q5 to also conduct at an increased rate. A second collector resistor R10 is chosen to have a low resistance relative to that of the detecting thermistor 14 in the cold state, but higher than the thermistor 14 in the operating region. This allows most of the voltage created by current passing through the second starting transistor Q5 to be dropped across the detecting thermistor 14 instead of resistor R10.

The increased current flowing through the second starting transistor Q5 causes the detecting thermistor 14 to heat up at a greatly increased rate. As the thermistor 14 heats up, its resistance decreases. Once the resistance of the thermistor 14 decreases far enough, the output voltage 49 drops below the breakdown voltage of zener diode D1, and both starting transistors Q4 and Q5 go into the off state. This will occur when the voltage 47 across the detecting thermistor 14 is slightly less than the breakdown voltage of the zener diode D1.

Although a preferred embodiment has been described in detail, it should be understood that various substitutions, alterations, and modifications may become apparent to those skilled in the art. These changes may be made without departing from the spirit and scope of the invention as defined by the appended claims.

What is claimed is:

1. Apparatus for positioning within a slowly moving fluid medium for sensing fluid flow velocity therethrough, comprising:
   (a) a tubular housing having intake and outlet ends;
   (b) turbulence reducing means within said housing for reducing fluid flow turbulence to an acceptable level;
   (c) a first thermistor disposed outside of said tubular housing;
   (d) a first current supply for supplying constant current to said first thermistor to develop a voltage across said first thermistor which is proportional to the ambient temperature of the fluid medium outside said housing;
   (e) a second thermistor disposed within said tubular housing;
   (f) a second current supply responsive to the voltage across said first thermistor for supplying current to said second thermistor, which current is proportional to the ambient temperature of the fluid medium outside said housing,
   whereby the voltage across said second thermistor is a function only of the temperature change of said second thermistor, independent of changes in the ambient temperature of the fluid outside said housing.

2. The apparatus as set forth in claim 1, wherein said first thermistor operates at substantially the same temperature as the ambient temperature of the fluid medium outside said housing, and said second thermistor operates at a temperature substantially greater than the temperature of the fluid flowing within said housing.

3. The apparatus as set forth in claim 2, further comprising heating means for applying a high current surge to said second thermistor to bring said second thermistor up to said operating temperature.

4. The apparatus as set forth in claim 3, said first thermistor is a positive temperature coefficient thermistor, and wherein said second thermistor is a negative temperature coefficient thermistor.

5. The apparatus as set forth in claim 1, wherein said turbulence reducing means within said housing comprises, in the direction of fluid flow: (1) a first stage of gradually increasing cross section; (2) a second stage of gradually decreasing cross section; and (3) a third stage comprising a flow restricting channel considerably smaller than said intake end.

6. A method for sensing fluid flow velocity within a slowly moving fluid medium, comprising the steps of:
   (a) positioning a flow-through housing within said flowing fluid medium;
   (b) positioning a first thermistor within said flowing fluid medium outside said housing;
   (c) positioning a second thermistor within said housing;
   (d) applying a constant current to said first thermistor to develop a voltage across said first thermistor which is proportional to the ambient temperature of fluid medium outside said housing;
   (e) applying a second current to said second thermistor, said second current being a function of the voltage across said first thermistor;
   (f) detecting the voltage across said second thermistor, which voltage is proportional to the fluid flow velocity within said fluid medium.

7. The method as set forth in claim 6, wherein said second current is proportional to the voltage across said first thermistor.

8. The method as set forth in claim 7, further comprising the step of applying an initial high current surge to said second thermistor to initially heat said second thermistor to a temperature substantially above the ambient temperature of the fluid medium.

* * * * *